(12) United States Patent
Fuls et al.

(10) Patent No.: US 6,575,308 B1
(45) Date of Patent: Jun. 10, 2003

(54) FILTRATION SYSTEM SUITABLE FOR MICROFILTRATION, ULTRAFILTRATION OR REVERSE OSMOSIS

(75) Inventors: Paul Fritz Fuls, Lynnwood Manor (ZA); André Keith Joubert, Mount Anderson (ZA); Diederik Arnoldis Kapp, Elandsrand (ZA)

(73) Assignee: Technology Finance Corporation (Proprietary) Limited, Sandton (ZA)

( * ) Notice: Subject to any disclaimer, the term of this patent is extended or adjusted under 35 U.S.C. 154(b) by 41 days.

(21) Appl. No.: 09/721,821

(22) Filed: Nov. 24, 2000

Related U.S. Application Data (63) Continuation of application No. PCT/IB00/00276, filed on Mar. 15, 2000.

(30) Foreign Application Priority Data

Mar. 25, 1999 (ZA) ............................................ 99/2312

(51) Int. Cl.$^7$ ............................................... B01D 35/00
(52) U.S. Cl. ....................... 210/418; 210/232; 210/240; 210/321.6; 210/422; 210/433.1; 210/510.1
(58) Field of Search ................................ 210/231, 233, 210/240, 321.6, 321.78, 418, 321.87, 420, 323.2, 422, 510.1, 445, 453, 483, 496, 433.1

(56) References Cited

U.S. PATENT DOCUMENTS

| 3,578,175 A | * | 5/1971 | Manjikian | 210/489 |
| 3,710,946 A | | 1/1973 | Sawyer | 210/336 |
| 3,774,771 A | | 11/1973 | Manjikian et al. | 210/433 |
| 4,990,248 A | | 2/1991 | Brown et al. | 210/136 |

FOREIGN PATENT DOCUMENTS

| GB | 2159729 | 12/1985 |

* cited by examiner

*Primary Examiner*—John Kim
(74) *Attorney, Agent, or Firm*—Fulbright & Jaworski L.L.P.

(57) ABSTRACT

The invention relates to a filtration system. The filtration system comprises a filter unit having a housing enclosing a filter element. The unit has an inlet into the housing upstream of the filter element. The unit also has a retentate outlet from the housing upstream of the filter element, and a permeate outlet from the housing, downstream of the filter element. The permeate outlet is isolated from the retentate outlet and inlet by the filter element, while the retentate outlet is spaced from the inlet and in communication therewith. The system also includes a bundle made up of a plurality of releasably interconnected modular members at least one of which includes a valve, the bundle forming a flow control unit which controls fluid flow from the inlet to the permeate outlet. The invention also provides the filter unit of the system.

11 Claims, 6 Drawing Sheets

FILTRATION SYSTEM SUITABLE FOR MICROFILTRATION, ULTRAFILTRATION OR REVERSE OSMOSIS

This application is a continuation of PCT Application No. PCT/IB00/00276 filed Mar. 15, 2000, which claims priority to South African Application No. 99/2312 filed Mar. 25, 1999.

THIS INVENTION relates to a filtration system and a filter unit suitable for microfiltration, ultrafiltration or reverse osmosis.

According to the invention there is provided a filtration system which comprises a filter unit having a hollow housing which encloses at least one filter element, the filter unit having a feed fluid inlet opening into the interior of the housing and communicating with an upstream side of each filter element, a retentate outlet leading from said interior of the housing and communicating with said upstream side of each filter element, and a permeate outlet leading from the interior of the housing and communicating with a downstream side of each filter element, said permeate outlet being isolated from the retentate outlet and from the inlet by the filter element or elements, and the retentate outlet being spaced from the inlet and in communication therewith, and the system including at least one bundle made up of a plurality of releasably interconnected modular members, which bundle forms a flow control unit for controlling fluid flow through the filter unit from its feed fluid inlet to its permeate outlet.

In the various embodiments of the invention described hereunder, various combinations of features are described or defined as simultaneously forming part of the invention. It is explicitly noted, however, that it is not essential that the features of these combinations be used simultaneously, and the invention contemplates that any one or more of such features can be omitted or altered, while one or more of the remainder are retained. In particular, any feature may be omitted, without enlarging the invention of extending its scope, provided that the features defined hereinabove are present.

The system can thus be regarded as including one or more bundles, at least one of which is made up of a plurality of interchangeable modules in the form of modular members constructed and arranged to form a flow control unit for controlling fluid flow through the filter unit from its feed fluid inlet to its permeate outlet. At least some of said modular members will respectively be of different functions and constructions from the remainder of said modular members; and the flow control unit will be arranged to control flow through at least one of said inlet and outlets of the housing. By 'modular' is meant that the modular members or modules are capable of being interchangeably nested or stacked, face-to-face if they are flattened in shape, or end-to-end if they are elongate in shape, to form a bundle or stack, each member being of the same outline, when viewed in end elevation, so that the stack or bundle has a substantially constant cross-sectional outline along its length.

The flow control unit may be associated with the feed fluid inlet to the housing interior and with the retentate outlet from said interior, so that it controls the rate of fluid flow from the feed fluid inlet to the retentate outlet. Instead, the flow control unit may be associated with the permeate outlet from the interior of the housing, so that it control the rate of fluid flow out of the retentate outlet. In a particular construction the filtration system may have two flow control units, one associated with the feed fluid inlet to the housing interior and with the retentate outlet of the housing interior, on the one hand, and the other associated with the permeate outlet from the housing interior, on the other hand, so that there is control of the rate of fluid flow both from the rear fluid inlet to the retentate outlet, and fluid flow out of the retentate outlet. In other words, the system may include two bundles of modular members, which bundles respectively form two flow control units, one for controlling fluid flow from the feed fluid inlet to the retentate outlet, and another for controlling fluid flow through the permeate outlet.

Each flow control unit may be separate from the filter unit, being connected thereto by a fluid flow line, such as a pipeline, in which case each flow control unit may be physically remote from the filter unit. Preferably, however, at least one, and conveniently each, flow control unit is mounted on the housing or forms part of the housing. Thus, each bundle of modular members may be mounted on the housing.

The housing may be elongated, being open at at least one end thereof, each open end of the housing being provided with an end closure, and at least one said end closure may be in the form of a said flow control unit as described above, so that each interchangeable modular member can be regarded as a closure member forming part of a said end closure.

The housing may be in the form of a cylindrical hollow tube of circular or other suitable cross-section, eg of stainless steel, open at both ends, so that the filter unit has a said end closure at each end thereof, the end closures being respectively bolted to flanges provided therefor, at opposite ends of the tube, by a plurality of bolts, circumferentially spaced about the housing and holding the end closures up against opposite ends of the housing, to close the housing. In another embodiment, wherein the filter unit is of relatively short length, bolts extending from one end closure to the other may be used to hold the end closures up against the respective ends of the housing, to close the housing. In each case, however, the bolts conveniently act to hold the modular members of each bundle together to form a flow control unit which acts as a said end closure for the tube.

In each case, in general, the housing may be tubular, having at least one open end closed by an end closure in the form of a said bundle of modular members forming a flow control unit; and the housing may have two open ends, each closed by an end closure, at least one of the end closures being in the form of a said bundle of modular members forming a flow control unit.

More particularly, said flanges and end closures may be of square (or other suitable) outline, having bolt holes at the corners thereof, there being four bolts passing through said bolt holes and bolting the end closures to the flanges. The fluid inlet and the outlets preferably each pass through a said modular member; and the modular members will have the same outline as the end closures, being interchangeably stackable against one another in series, face-to-face. Thus, each modular member may be in the form of a square plate, of lesser or greater thickness as required for its function and construction, and having bolt holes at its corners. The filter unit will thus have, in this case, an end closure at each end of the housing, at least one said end closure being of composite construction and being made up of a plurality of said modular members, stacked face-to-face, sandwich fashion.

The end closures may each be provided with at least one sealed coupling passage to enable a plurality of filter units to be coupled together via the sealed coupling passage. Such plurality of filter units may be coupled together into any desired configuration, thereby to provide for series flow or for parallel flow or for a combination thereof, ie series/parallel flow or cascade-type flow.

Typically, there may be a single filter element of porous sintered ceramic material, the filter element having a plurality of passages in its interior, the passages extending alongside one another and being transversely spaced from one another, at least one of the passages being a filtration passage in communication with the feed fluid inlet and with the retentate outlet and at least one of the passages being a drainage passage, and each drainage passage being in communication with the permeate outlet and being isolated from each filtration passage. Instead, however, there may be a plurality of the filtration passages, the filter material acting as a filter membrane support and each filtration passage being lined with a filter membrane, there being a plurality of the drainage passages and the filter element having an outer surface the major part of which faces into a space between the filter element and the housing. When a said bundle of modular elements is mounted on the housing, the bundle may include a modular member in the form of a flow deflector member, the filter element having a plurality of filtration passages and the deflector member defining at least one fluid flow path for deflecting fluid flowing along a filtration passage in the filter element into another filtration passage in the filter element. In particular, the filter element may be elongate, the housing being elongate and the filter element extending along the interior of the housing, the filter element having a cross-sectional area equivalent to the area of a circle having a diameter of 40–200 mm, and the filter element having a length of 1.5–6 m.

In a particular embodiment of the invention there is thus a single filter element in the form of an elongated membrane support comprising a straight sintered ceramic extrusion, eg a circular-cylindrical sintered α-alumina extrusion, the filter element having a plurality of transversely spaced passages extending along its length, conveniently straight and parallel to one another. At least one, and, as indicated above, usually a plurality, of these passages will each be a filtration passage, optionally being lined with a filter membrane which may be sintered to the inner surface of the passage, each filtration passage being on the upstream side of the filter element and in communication with the fluid inlet and with the retentate outlet. Optionally, one or more of the passages may be a drainage passage, each drainage passage being isolated from the filtration passage and being on the downstream side of the filter element, in communication with the permeate outlet, the outer surface of the filter element facing into a space between the filter element and the housing which is also in communication with the permeate outlet. Instead, if desired, each filter element or membrane support may be of another material, such as fabric, paper, a plastics material, porous stainless steel or other metal which may be sintered, another sintered ceramic, or the like.

As indicated above the—alumina support typically has a diameter of >40 mm, usually 40–200 mm, eg about 100 mm, and a length of 1.5–6 m, usually 1.5–2.5 m, eg 2 m. The filtration passages may all be of the same diameter and may be of the same size or smaller than the drain passage or passages, all the drain passages, if there are several, being of the same diameter. The diameters of the filtration passages and drain passages may be in the range 2–20 mm, usually 4–14 mm, eg about 10 mm. The filtration passages may be arranged so that, viewed in end elevation, there are concentric circular rows of filtration passages, the filtration passages of each row being circumferentially spaced in series from one another and the rows being radially spaced from one another, each row being concentric with the axis of the support. The outermost row may have the most said filtration passages therein, the next row radially inwardly therefrom having fewer said passages, and the number of passages in the rows decreasing progressively radially inwardly from row to row, so that the innermost row has the fewest passages. The filtration passages may be more or less equally spaced from one another and the rows may be more or less equally spaced form one another by the same spacing as that between the passages, and the spacings between the rows, between the innermost row and the drain passage and between the outermost row and the support outer surface, may be more or less the same or equal. In the case of a circular-cylindrical ceramic filter element, the filter element may be concentrically mounted in the housing tube with an annular space therebetween, each end of the tube being held by a plurality of circumferentially spaced spacers, which may be elastomeric, and which project radially inwardly from the housing to engage curved outer surface of the support to hold it concentrically in the housing tube. The housing may be made of two portions, eg the housing tube and a collar at one end of the tube, one of said portions, eg the collar, being receivable spigot/socket fashion in the other so that it is telescopically slidable therein, the radial space between the housing portions being sealed by a peripheral seal which permits the one portion to slide telescopically and sealingly within the other, to alter the length of the housing to cater for unequal changes in length of the housing and in the length of the support, arising from unequal thermal expansion thereof. In other words, the housing may be made up of two portions, one of which is received spigot-socket fashion in the other, being telescopically slidable therein and sealed thereto, to permit unequal thermal expansion of the housing and each filter element enclosed therein.

A seal such as a disc-like elastomeric sealing pad may be provided at each end of the ceramic element, sandwiched between said end and the adjacent end closure and, if there is a bundle or stack of modular members forming a composite end closure at one or each end of the ceramic element, there may be a similar elastomeric pad between each adjacent pair of modular members. Each said pad will have flow apertures therethrough, registering with the ends of the passages in the filter element, and/or registering with flow passages through the modular member or members in contact therewith, as the case may be. Suitably located springs, such as disc springs, may be provided to keep the pads under compression in the axial direction of the filter element, to promote good sealing by said pads and to cater for said unequal thermal expansion between the filter element and the housing tube. Instead, or in addition, the filter element or support may be sealed to the housing, at the end of the support remote from the permeate outlet, by an O-ring seal or a diaphragm-shaped peripheral elastomeric seal under compression between the support and the housing, so that the seal is deformed and seals effectively, whether or not there is a pressure drop in either direction across it.

At each end of the filter element there may be at least one modular member in the form of a flow deflector plate for deflecting fluid flow issuing from a plurality of filtration passages at that end of the filter element into a plurality of other filtration passages so that there is flow reversal, i.e. so that the fluid flows along said other passages in the opposite direction along the filter element. Each deflector plate may thus have a plurality of grooves or elongated depressions or cavities on its axially inwardly facing surface for this purpose, each groove being arranged on said surface so that it receives said fluid issuing from at least one of said plurality of passages, and channels it into a said other passage. Instead, each deflector plate may be provided with a plurality of passages for this purpose, registering with said filtration passages.

It will be appreciated that the grooves can be arranged to provide for flow along all the passages in series with one another, or to provide for series/parallel flow whereby a plurality of groups of passages are provided, flow along the groups being in parallel and flow along the passages of each group being in series. Furthermore, the grooves can be arranged for cascade flow, whereby fluid issuing from said plurality of passages is deflected into a plurality of other passages, the number of other passages into which the fluid is deflected being fewer than the number of passages from which it issues. One or more cascades can be provided in this fashion, eg a plurality of cascades in parallel with one another. Naturally, if deflector plates are omitted entirely, the filter element can provide for parallel once-through flow of fluids. The filtration passage or passages at the upstream end of each series or cascade will be in communication with the filter unit feed fluid inlet, and the filtration passage or passages at the downstream end of each series or cascade will be in communication with the retentate outlet.

In filter units of the type in question provision is often made for one or more of back-pulsing with optional intensification thereof, backwashing, steam sterilization, sponge-ball cleaning of debris from the filtration passages, throttling of the retentate outlet to pressurize the fluid on the upstream side of the filter element, and the like, such provision requiring the provision of various flow control valves. Accordingly, the system of the present invention may provide for one or more of these features, one or more of the modular members containing the flow lines and the valves required therefor, these modular members being sandwiched face-to-face and forming part of one or the other end closure for the housing tube. Preferably, the flow lines are defined by cavities and/or passages within the modular members and the valves are located within such cavities or passages. Furthermore, the system may include a modular member provided with catch pots which contain sponge-balls, together with a modular member containing a valve bridge for reversal of the direction of flow through the filtration passages when they are arranged in series, for fluid flowing from the feed inlet via the catch pots and filter element to the retentate outlet; it may include a modular member provided with a steam inlet line; it may include a modular member comprising a programmable electronic controller or microprocessor for valve operation; it may include a modular member provided with a back-pulse intensifier; it may include a modular member provided with a back-pulse accumulator; it may include an intensifier modular member provided with a pressure intensifier or fluid capacitor defining a fluid reservoir; it may include a flow reversal modular member provided with a flow reversal valve for reversal of the direction of fluid flow through the filter element; it may include a modular member containing a back-pulse flow line for connection to an internal or external back-pulse accumulator unit; and one or more modular members may be provided with one or more valves for connecting the downstream side of the filter unit with the steam inlet line, with the back-pulse flow line, with the back-pulse intensifier, and/or with the permeate outlet, as the case may be.

The throttling valve for the retentate outlet may be of any suitable construction and may be operated by an electric motor via a suitable drive. The remaining valves are preferably of the elastomeric tubular sleeve type, co-operating with an internally mounted caged torpedo, operable by external fluid pressure on the sleeve to pinch it on to the torpedo to close the valve, said fluid pressure optionally being supplied by the fluid feed via a solenoid valve. The throttling and other valves may be controlled by said electronic controller or microprocessor, which may have inputs with regard to fluid temperature, with regard to fluid pressure and with regard to fluid flow rate, derived from sensors therefor mounted in one or more of the modular members.

In one particular embodiment of the filter unit, the filter unit may be provided with a flow reversal modular member forming part of each end closure, with the flow apertures in the flow reversal modular members registering with the ends of the passages in the filter element.

As mentioned above, the modular members may be of modular configuration and can be sealingly coupled together in series, with the aid of sealing pads, at each end of the filter unit, to make up the respective end closures there.

In another particular embodiment, the filter unit may be provided with a flow reversal modular member having passages provided therein arranged to permit control of flow reversal by means of opening or closing a plurality of, eg four, valves located in said passages. The valves may be of the type actuated by fluid pressure to permit rapid opening or closing thereof, such as valves having a flexible sleeve as described above, eg torpedo type valves. The filter unit is also in this case preferably provided with at least one modular member having catch pots and sponge balls.

According to a further embodiment of the filter unit, the filter unit may include an intensifier modular member or fluid capacitor modular member forming part of one of the end closures, with the intensifier modular member defining a fluid reservoir for containing pressurized fluid and being in fluid communication with the filtration system and having a fluid outlet connected by means of passages and valves provided in said intensifier modular member and/or in one or more additional modular members, to provide high-pressure back-pulsing of fluid through the modular members on the downstream side of the filter element. The intensifier modular member may be provided with a piston defining a wall of the fluid reservoir which is displaceable to permit transfer of pressure from the fluid in the filter system to the fluid in the reservoir. Preferably, the diameters of the portion of the piston and sleeve on the fluid reservoir side are smaller than those of the portion of the piston and the sleeve in fluid communication with the filtration system. Preferably, the valves in this embodiment are actuated electronically in response to programmed instructions or in response to automatic sensing of measured signals such as fluid pressure and/or fluid flow rate in the filtration system, to control back-pulsing.

According to a further embodiment, the filter unit is provided with a sterilization modular member provided with a steam inlet line, this modular member being located on the downstream side of the filter element and steam flow into the filter element being controlled by means of valves provided in said modular member.

In another preferred embodiment, the filter unit is provided with an integrated electronic control system or electronic controller which is electronically- or fluid-actuated. The electronic control systems may detect or measure fluid- or filter unit variables, such as at least one of pressure, volume and temperature, to thereby actuate, in the correct or desired sequence, various modular members and valves to control the operation of the filter unit, eg for sterilization, back-pulsing, etc., or to control the operating pressure of the filter unit. Preferably, the control system is programmed by means of suitable algorithms to enable the control system to decipher or respond to input signals or measurements, thereby to determine the desired response and to control the filtration.

The invention also extends to a filter unit which comprises a preferably elongated hollow housing which is provided at opposite ends thereof with respective end closures, the housing enclosing at least one filter element comprising sintered ceramic material, the unit having a feed fluid inlet opening into the interior of the housing and communicating with an upstream side of the or each filter element, a retentate outlet leading from the interior of the housing and communicating with said upstream side of the or each filter element, and a permeate outlet leading from the interior of the housing and communicating with a downstream side of the or each filter element, said permeate outlet being isolated from the retentate outlet and from the inlet by the filter element or elements and the retentate outlet being spaced from the inlet and in communication therewith, the housing comprising two portions telescopically slidable relative to each other and sealed together by a peripherally extending seal therebetween which permits one said portion to slide longitudinally within the other.

While the construction of the filter unit, and the various features which it may have, may generally be as described above for the system of the present invention, in a particular embodiment of the filter unit there is a single filter element or support which has a diameter of >40 mm, eg up to 100 mm or more and a length of >1500 mm, eg 2–6 m, having a plurality of filter passages extending along its length. The support, in a particular embodiment which is described in detail as an example to illustrate the invention, may have one or more drainage passages extending along its length. In particular, the support may have 20 or more filtration passages, eg about 40, arranged in radially spaced concentric circles of circumferentially spaced passages about the axis of the support, which is conveniently circular in cross-section, when viewed in end elevation, the outermost ring having the most passages and the number of passages in each circle decreasing progressively from circle to circle in the radially inward direction of the support, so that the innermost ring has the fewest passages. The passages may be more or less equally spaced from one another and from the outer surface of the support. Conveniently there is a single central drainage passage, of the same diameter or larger than the filtration passages, which are preferably all of the same diameter. At least one of the end closures may be in the form of a bundle made up of a plurality of releasably interconnected modular members, the bundle optionally forming a flow control unit for controlling fluid flow through the filter unit from its feed flow inlet to its permeate outlet. The other end closure may be a simple wall, or it may be another bundle made up of a plurality of releasably interconnected modular members.

It will be appreciated that, although separate modular members have been described above with separate functions, several functions may be contained in a single modular member.

The invention also provides a novel flow control unit comprising a bundle of modular members as described above, for connection to hollow housing of a filter unit, either via a flow line or mounted on the housing to form part of the filter unit.

The filtration system of the present invention is expected usually to be controlled so as to meet a certain range of recovery ratios with a given system input. In this regard a recovery ratio is defined as the ratio of a quantity of feed which is filtered out by a filter, ie the filtrate, to the total feed to the filter. The quantity of feed which is not filtered out by the filter is the retentate. The recovery ratio is usually expressed as a percentage, eg 80% recovery means that there is 80% filtrate and 20% retentate after filtration. Thus an 80% recovery ratio will take place when the retentate flow rate is 20%, and the filtrate flow rate is 80%, of the feed rate into the system. During use, filters of the type in question often become clogged, and it then becomes necessary to control the recovery ratio by controlling the exit rate at which the retentate issues from the filter.

The filtration system of the present invention may conveniently be controlled by the control method and controller of the Applicant's co-pending application Ser. No. 09/722, 161.

The invention will now be described, by way of example, with reference to the accompanying diagrammatic drawings, in which.

Figure 1:
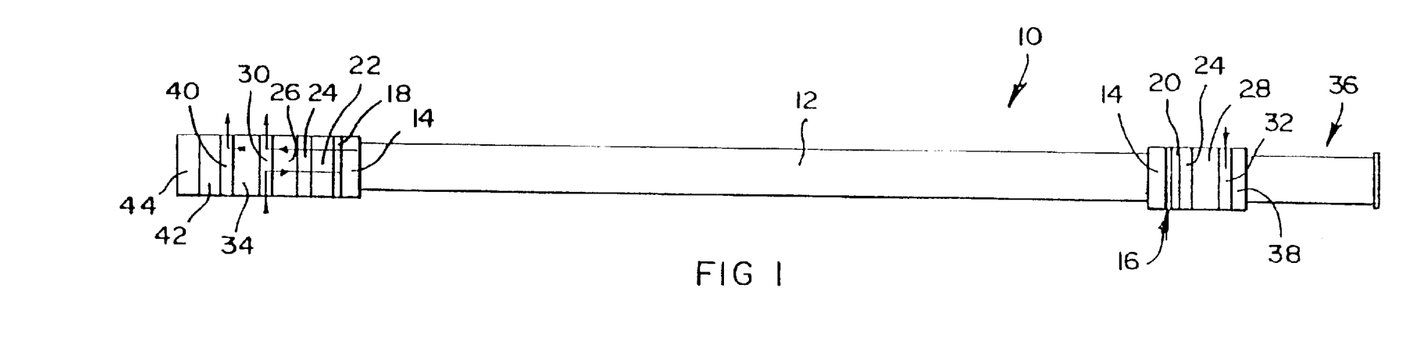
FIGS. 1 and 2 show respectively a side elevation and a schematic exploded side elevation of a filtration unit forming part of the filtration system according to the present invention.
Figure 2:
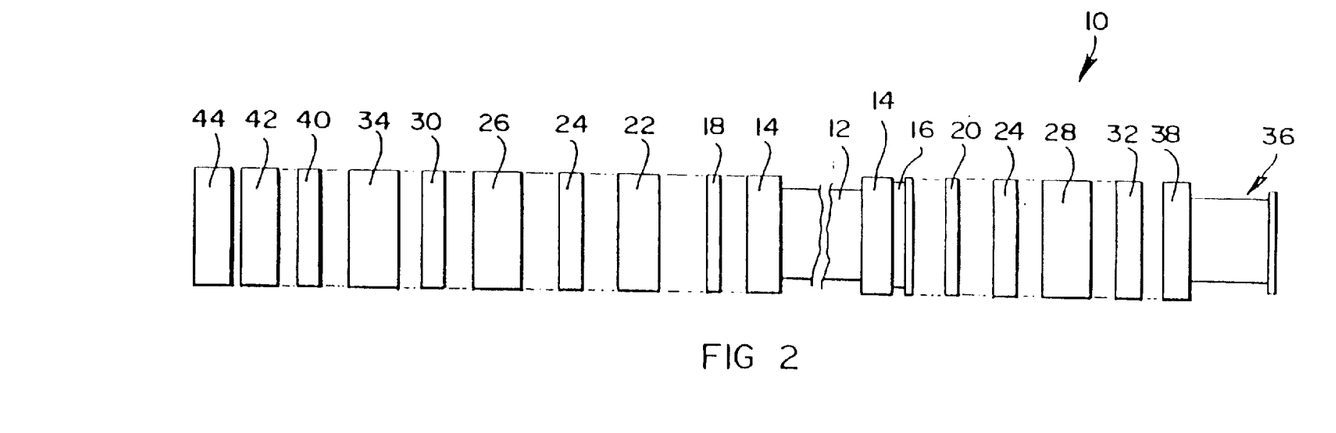

Dealing first with FIGS. 1 and 2, reference numeral 10 generally designates a filter system in accordance with the present invention. The system 10 comprises a filter unit which in turn comprises a circular cylindrical stainless steel housing tube 12 of 2 m length having a square (in end elevation) flange 14 at each end thereof, with bolt holes in the corners thereof. An axially slidable collar 16 is shown slidably and sealingly inserted into one end of the tube 12.

A modular member in the form of a deflector plate 18 is provided against the flange 14 at the end of the tube opposite the collar 16; and a further modular member in the form of a deflector plate 20 is provided against the collar 16. Abutting the plate 18 is provided a modular member in the form of a catch pot plate 22, and against the plates 20 and 22 are provided modular members in the form of perforated plates 24.

At the same end of the tube 12 as the catch pot plate 22 is provided, on the opposite side of the perforated plate 24, a modular member in the form of a valve plate 26, and a modular member in the form of a valve plate 28 is provided against the other perforated plate 24. Modular members in the form of plates containing flow passages and respectively designated 30 and 32 are provided respectively against the plates 26 and 28. Against the plate 30 is provided a modular member in the form of a valve plate 34, and an intensifier modular member 36 having a square (in end elevation) flange 38 is provided against the plate 32.

Against the plate 34 is provided a modular member in the form of a plate 40 containing a flow passage, and, in turn, a modular member in the form of a pilot valve plate 42 is provided against the plate 40 and a modular member in the form of a programmable electronic control unit or microprocessor plate 44 is provided against the plate 42.

It will be appreciated that, in the aforegoing, when a modular member or plate has been described as being against another plate, the various items have been named moving axially outwardly from opposite ends of the tube 12, so that each item is against the axially outer side of the preceding item. At each end of the tube 12, all the plates and the flange 38 are of square outline or end elevation, having bolt holes at their corners, and bolts are provided in these holes whereby the plates are bolted together, stacked face-to-face, against their respective associated flanges 14.

It should further be appreciated that, between the collar 16 and the adjacent plate 20, and between the succeeding plates at that end of the tube 12 and between the plate 32 and flange 38, are provided elastomeric sealing pads in the form of circular discs, a representative one of which will be described hereunder with reference to FIG. 9. Similarly, at the opposite end of the tube 12, there is a similar pad between the flange 14 and the plate 18, with further pads between succeeding plates, up to the plate 40. Tension in the bolts keeps these pads resiliently under compression in sealing abutment with the plates and flanges on opposite sides thereof, and a disc spring is provided, eg between the plates 14 and 18, to provide a compressive force between them, which urges them against each other. Instead of the disc spring, another suitably resilient member may be used.

The various modular members 18–36 and 40–44 form, at each end of the tube 12, a modular bundle or stack of modular members which acts, as will emerge hereunder, as a flow control unit, in each of which flow control units the modular members form modules, which, within limits, can be interchanged and which can be easily replaced by replacement modules.

In the interior of the tube 12 is provided a filter element 46 (FIG. 3), and it will be appreciated that the elastomeric pad respectively between the plates 18 and 20 and the filter element 46 at opposite ends of the tube 12 are gripped between said plates 18 and 20 and opposite ends of the filter element 46, to seal off opposite ends of the filter element 46, the flanges 14, on their outer faces, having circular recesses for receiving these pads to make this sealing against the element 46 possible. The abovementioned compression enables the necessary compressive force to be exerted on these pads, thereby to affect a desired sealing pressure against the filter element 46.

Figure 3:
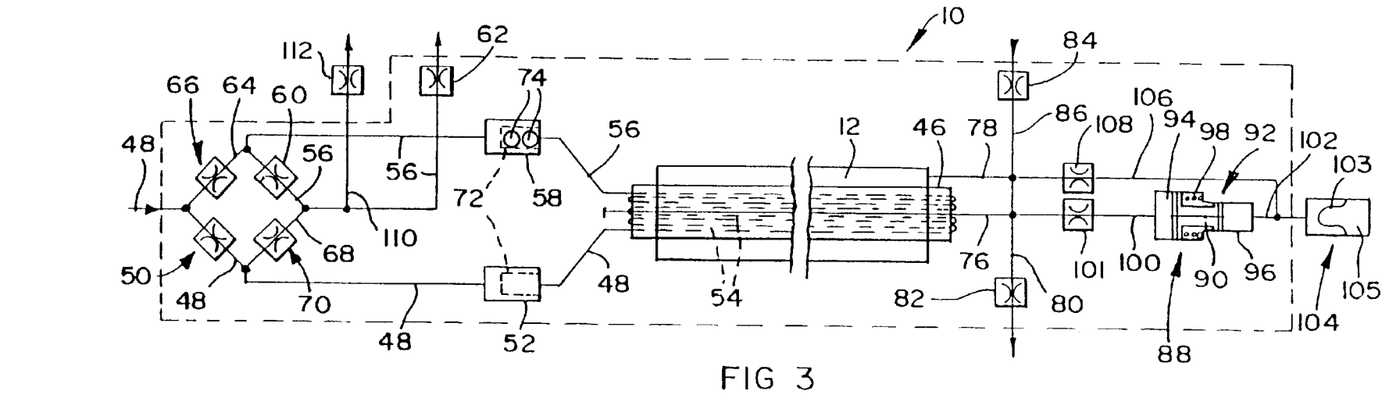
FIG. 3 shows a flow diagram of the unit of FIG. 1.

With reference also to FIG. 3 a fluid feed line 48 feeds from a feed pump not shown) into the plate 30 and via a valve 50 in the plate 26 and then through a catch pot 52 in the plate 22 into a filtration passage 54 in the filter element 46. In this regard it will be appreciated that the plates 18, 22, 24 and 26 at that end of the tube 12, and the sealing pads therebetween, have registering apertures or passages which combine, with the valve 50 and catch pot 52, to make up the flow line 48.

The passages 54 in the element 46 are arranged so that fluid flow along them takes place in series, and issues from the final tube 54 in the series along retentate flow line 56 including catch pot 58, valve 60 and valve 62 and then out of the plate 40. The catch pot 58 is in the plate 22, the valve 60 on the plate 26 and the valve 62 being on the plate 34.

It will be appreciated that, once again, the plates 18, 22, 24, 26, 30, 34 and 40, together with the elastomeric pads therebetween, have appropriate apertures and passages therethrough which combine, together with the catch pot 58 and valves 60, 62, to make up the flow line 56.

Flow line 48 is, upstream of valve 50, connected to flow line 56 between catch pot 58 and valve 60 by flow line 64 containing valve 66; and flow line 48, between valve 50 and catch pot 52 is connected to flow line 56 between valve 60 and valve 62 by flow line 68 containing valve 70. During one half of a normal operating cycle valves 66 and 70 are closed and valves 50 and 60 are open. If it is desired to reverse the direction of flow to the passages 54 of the filter element 46, valves 66 and 70 can be opened, while valves 50 and 60 are closed. This causes feed fluid to enter the element 46 along flow line 56 via valve 66 and catch pot 58, and to issue from element 46 along flow line 48 via catch pot 52, valve 70 and valve 62. Each catch pot is shown containing a cage 72, the cage 72 of the catch pot 58 containing two sponge balls 74, whose use will be described hereunder.

The filter element 46 is of sintered $\alpha$-alumina, and has thirty-six filtration passages therein, each of whose internal surfaces is coated with a filter membrane sintered to said internal surface. Each filtration passage is 9 mm in diameter and the filtration passages are arranged in three concentric rings when the element 46 is viewed in end elevation, namely an outer ring comprising eighteen circumferentially spaced passages 54, an inner ring comprising six circumferentially spaced passages 54, and an intermediate ring comprising twelve circumferentially spaced passages 54. In each ring the passages are equally circumferentially spaced, and the rings are spaced radially from each other, the innermost ring being spaced from the axis of the element 46, said radial spacings being substantially equal.

The deflector plate 20 has a plurality of grooves on its axially inner face, each of which grooves is shaped and arranged on said inner face so as to connect the ends of two passages 54 and so as to place them in communication with each other, while isolating them from other passages 54. Similarly, the deflector plate 18 at the opposite end of the tube 12 has grooves for this purpose.

The plate 18 has two apertures therethrough, respectively for admitting feed fluid flow from the flow line 48 into one of the passages 54 and for admitting retentate flow from one of the passages 54 into the retentate flow line 56. The plate 20 omits these passages, but in turn has a central aperture therethrough registering with an axially located 9 mm diameter drainage passage (not shown) in the element 46, and a ring of elongated arcuate apertures, radially outwardly of its grooves, said central aperture and ring of apertures being for permeate flow through the plate 20 as described hereunder. The opposite end of said drainage passage is closed off by the elastomeric pad between the plate 18 and flange 14 at the opposite end of the element 46.

The grooves in the plates 18 and 20 are arranged to connect the passages 54 of the element 45 end-to-end in a single series, the series starting with the passage 54 into which the feed line 48 feeds, and ending with the passage 54 which feeds into the retentate line 56.

The collar 16 is radially spaced from the element 46, and the arcuate apertures in the deflector plate 20 communicate with this radial space and with the annular space between the tube 12 and filter element 46. The flow lines constituted by said central aperture and arcuate peripheral apertures in the plate 20 are designated respectively 76 and 78 in FIG. 3, and these feed into a permeate flow line 80 provided with a valve 82. The valve 82 is provided in the plate 28 and the permeate flow line 80 issues from the unit 10 via plate 32.

Plate 28 contains a steam valve 84 and a steam flow line 86, which communicates with flow lines 76 and 78 and enters the unit 10 through plate 32, passing through the valve 84 in plate 28 and into the flow lines 76, 78 and 80.

A pulse intensifier 88 (FIG. 3) is located in the modular member 36 and comprises a piston 90 slidable in a cylinder 92 which has a wide portion 94 and a narrow portion 96, which defines a fluid reservoir. The piston 90 is shown acting against a spring 98.

The wide portion 94 of the cylinder 92 communicates via flow line 100 containing valve 101 with flow line 80. Valve 101 is located in plate 28 and reservoir 96 in turn communicates with flow line 102 in modular member 36 for connection to an external back-pulse accumulator 104 having a diaphragm 103 and gas space 105. Alternatively, an internal accumulator (as described with regard to FIGS. 13 and 15 below) can be used, and/or a piston-type or any other suitable accumulator (not shown) can be substituted for the diaphragm-type accumulator 104. Flow line 102 is connected by a flow line 106 which communicates via a valve 108 located in the plate 28 with the flow line 80. Flow lines 100 and 106 are thus each in communication with both of flow lines 76 and 78, ie with the drainage passage in the filter element 46, and with the space in the tube 12 around said filter element.

Finally, with regard to FIG. 3, it should be noted that flow line 56, between valve 60 and valve 62, has a branch line 110 leading to an external valve 112 which controls the retentate flow during filtration and therefore controls the operating parameters of the filter unit 10, such as filtration pressure, permeate flow rate, etc.

Figure 4:
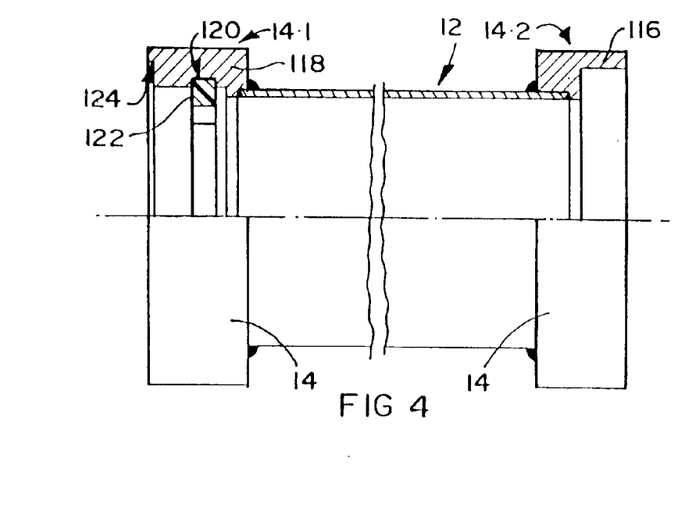
FIGS. 4 and 5 show respectively a part-sectional side elevation and end elevation of the housing tube of the unit of FIG. 1.
Figure 5:
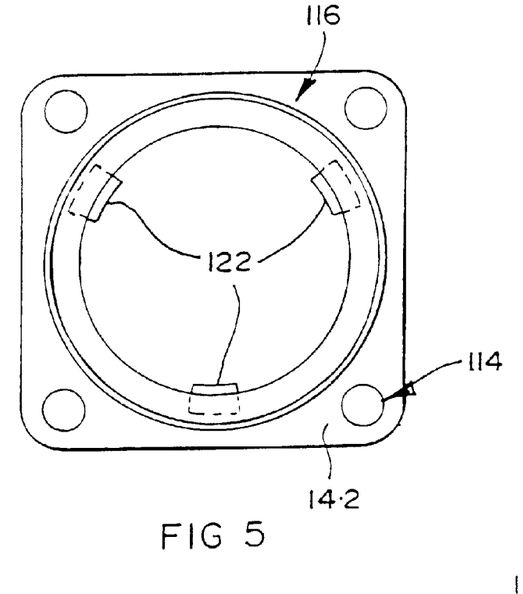

Turning to FIGS. 4 and 5, the same reference numerals are used to designate the same parts as in FIGS. 1 and 2, the tube being designated 12, and the flanges 14 being distinguished by being designated respectively 14.1 and 14.2. Bolt holes 114 are shown in the flange 14.2, and the flange 14.2 is shown having an axially outwardly extending socket formation 116 for receiving the collar 16 as described hereunder. The flange 14.1 is shown having a hollow cylindrical axial extension 118, provided on its inner surface with a radially inwardly facing circumferential groove 120 which contains three equally circumferentially spaced elastomeric spacers 122 which engage the outer curved surface of the filter element 46 to space it concentrically within the tube 12.

The end face of the extension 118 has a shallow rebate 124 for receiving the elastomeric sealing pad between the flange 14.1 and the plate 18.

Figure 6:
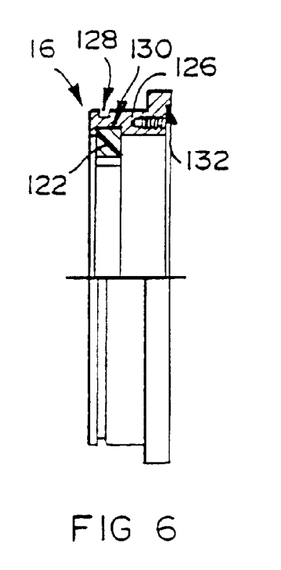
FIGS. 6 and 7 show views similar to those of FIGS. 4 and 5 of the collar of the housing of FIGS. 4 and 5.
Figure 7:
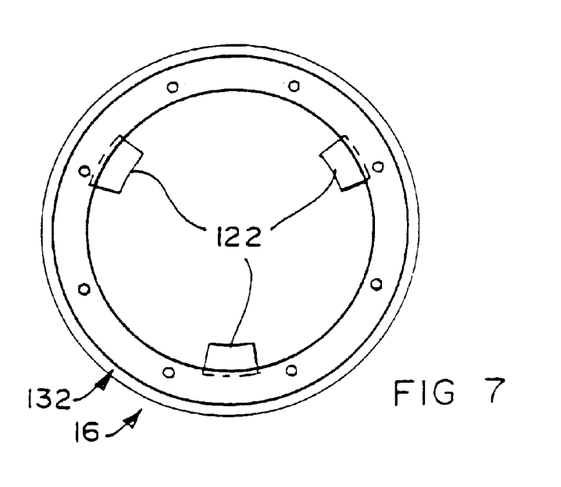

Turning to FIGS. 6 and 7, the collar is designated generally 16. The collar has a spigot portion 126 with a radially outwardly facing circumferential groove 128 therein, and a radially inwardly facing circumferential groove 130. The groove 128 is for receiving at least one circumferentially extending elastomeric seal or the like (not shown) which seats in said groove 128. It will be appreciated that the spigot 126 is received spigot/socket fashion in the socket 116 of the flange 14.2 (FIG. 5). The seal in the groove 128 is compressed between the spigot 126 and the socket 116, and seats sealingly thereagainst, while permitting the collar 16 to slide axially and sealingly relative to the tube 12. The groove 130 in turn has, seated therein, three elastomeric spacers, again designated 122, whose function is the same as that of the spacers 122 of the tube 12, and they act to space the opposite end of the filter element 46 concentrically in the collar 16 and hence in the housing 12. The collar 16 has a shallow circumferentially extending rebate 132, similar to the rebate 124 of the extension 118 of the flange 14.1, for receiving the elastomeric sealing pad between the collar 16 and deflector plate 20.

Figure 8:
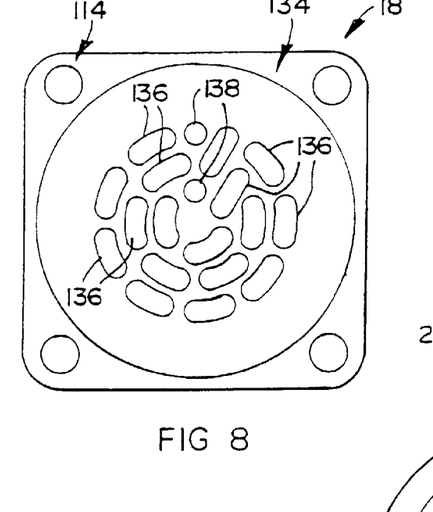
FIG. 8 shows a front elevation of a deflector plate forming part of the unit of FIG. 1.

In FIG. 8 the deflector plate 18 is shown. It is broadly square in outline having bolt holes 114 and, on its face facing towards the housing tube 12, a circular recess 134. On the floor of the recess the plate 18 has a plurality of grooves 136, and it has a pair of apertures 138 therethrough. The apertures 138 are respectively for admitting flow into one of the passages 54 of the filter element 46 from flow line 48, and for admitting flow from another of the passages 54 of the filter element 46 into the flow line 56. The grooves 136 are those described above which interconnect one end of a passage 54 in the filter element 46 to the adjacent end of another passage 54 in the element 46, thereby to connect said passages 54 end-to-end in series.

It should be noted that the deflector plate 20 is essentially of similar construction to the deflector plate 18, except that, naturally, the layout of the grooves 136 will be different, as dictated by the layout of the particular pairs of passages 54 of the filter element 46 which have to be connected thereby end-to-end in series. Furthermore, as mentioned above, the apertures 138 will be omitted from the deflector plate 20, and the deflector plate 20 will have, at a position spaced radially outwardly of the radially outermost grooves 136 shown in FIG. 8, a ring of circumferentially elongated apertures (not shown in FIG. 8) in the floor of the recess 134. These apertures will have substantially the same outline as the grooves 136 and substantially the same spacing therebetween, and will permit permeate flow from one side of the plate 20 to the other. Similarly the plate will have a central circular aperture therethrough, similar in size to the apertures 138, for the same purpose.

Figure 9:
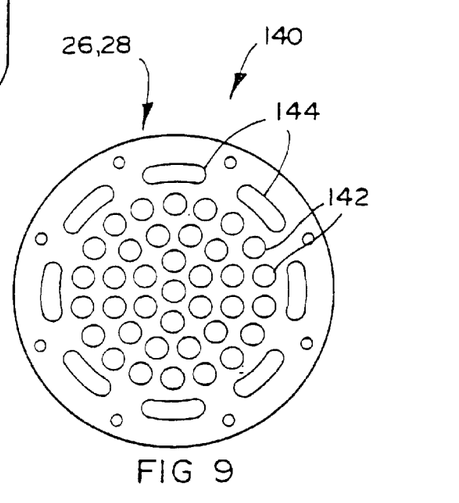
FIG. 9 shows a front elevation of an elastomeric sealing pad of the unit of FIG. 1.

Turning to FIG. 9, one of the elastomeric sealing pads is generally designated 140. It is circular in outline. It is a pad intended to be located between the deflector plate 20 and the adjacent end of the filter element 46. The pad 140 has a plurality of circular apertures 142 therein. These apertures 142 comprise a central aperture, registering with the drainage passage in the filter element 46 and the central aperture in the plate 20, and three concentric rings or apertures around said central aperture. The apertures 142 of the concentric rings number respectively eighteen for the outermost ring, twelve for the intermediate ring and six for the innermost ring, accordingly corresponding with the number and layout of the passages 54 in the filter element 46. Radially outwardly of the outermost ring of the apertures 142 is a ring of arcuate elongated equally spaced apertures 144, which correspond, in shape and layout, and which register with, the arcuate apertures described above in the deflector plate 20.

Figure 10:
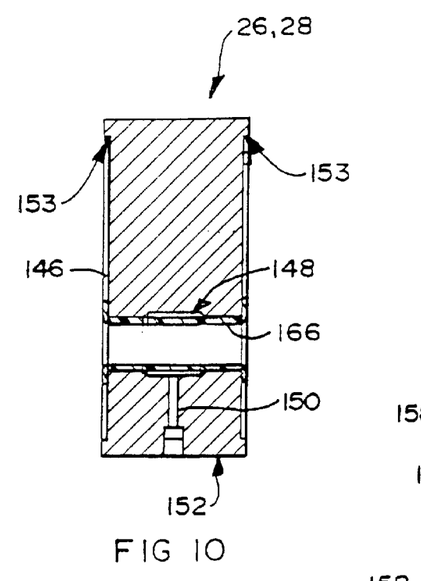
FIGS. 10, 11 and 12 respectively a section through a modular member in the form of a valve plate of the type employed by the unit of FIG. 1, a side elevation of a torpedo and cage for the valve plate and a sectional side elevation of said torpedo and cage.
Figure 11:
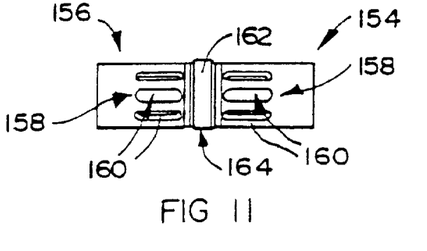
Figure 12:
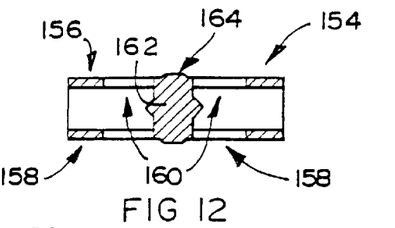

Turning to FIGS. 10–12, one of the plates 26, 28 is shown schematically. This plate has a passage 146 therethrough with an enlarged central portion 148 constituting a valve housing. A bleed passage 150, extending transversely to the passage 146, leads from the radially outer surface of the plate 26, 28 into the enlarged portion 148 of the passage 146. The plate 26, 28 has shallow rebates 153 on opposite sides thereof for receiving sealing pads (see FIG. 9).

In FIGS. 11 and 12 a valve cage/torpedo arrangement is generally designated 154. The arrangement 154 comprises a cylindrical cage 156 having two tubular portions 158 with circumferentially extending axially spaced rows of circumferentially spaced axially elongated slots 160 therein. The tubular portions 158 are separated by a solid partition 162 within the cage 156, and having a flat radially outwardly facing circumferentially extending surface 164. Naturally, instead of the slots 160, the arrangement 154 can be provided with rows of apertures or circular holes therein (not illustrated), each slot 160 being replaced by a row of holes, the rows being located where the slots 160 are shown in FIG. 11.

A resiliently flexible hollow cylindrical elastomeric sealing member (not shown) is provided in the enlargement 148 of the passage 146 of the plate 26, 28, opposite ends of this sealing member engaging the material of the plate 26, 28. Fluid pressure admitted to the enlargement 148 via the passage 150 causes this sealing member to seat sealingly against the outer surfaces of the tubular portions 158 surrounding the apertures 160. Relief of this pressure allows the sealing member to rest in a substantially unstressed condition against the surface 164, so that fluid pressure exerted through the slots 160 by fluid in the passage 146 can force the sealing member away from the surface 164, thereby allowing fluid flow to take place along the passage 146, through the slots 160 and through the annular space around the surface 164, between the surface 164 and said sealing member.

Figure 13:
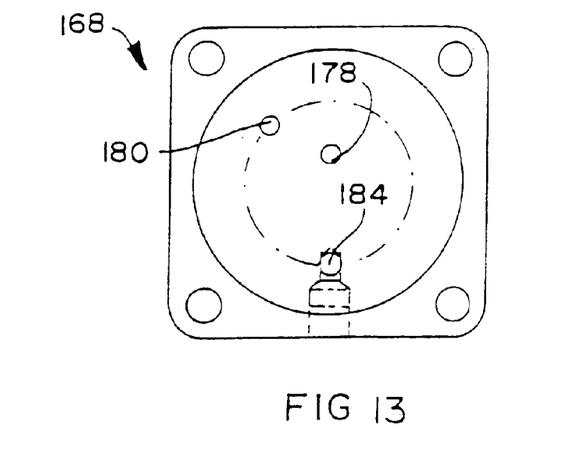
FIGS. 13, 14 and 15 show respectively end elevations and a part-sectional side elevation of another embodiment of a back-pulse accumulator which can be used in the unit of FIG. 3.
Figure 14:
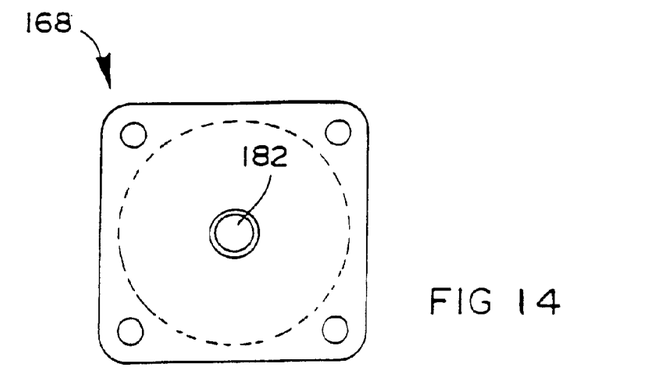
Figure 15:
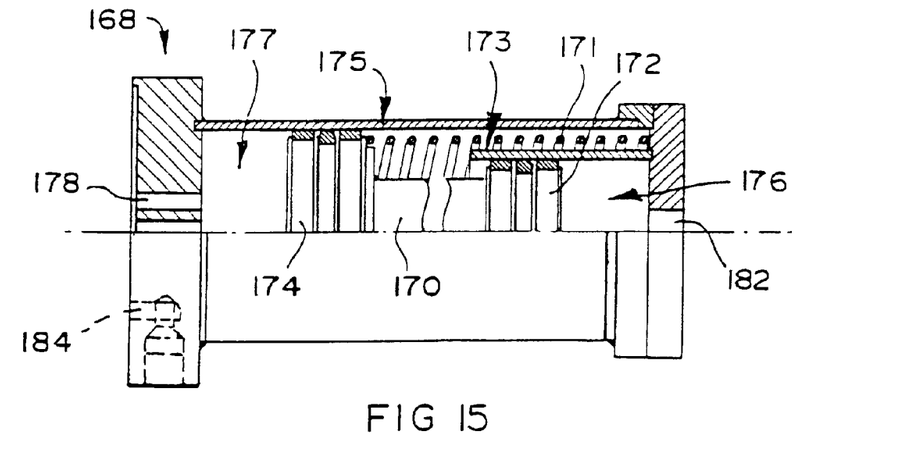

FIGS. 13, 14 and 15, show details of an intensifier member 168 shown schematically at 88 in FIG. 3. The intensifier member 168 comprises a piston 170 having a narrow head 172 and a broad head 174, the heads 172, 174 being slidable respectively in narrow and broad cylinder sleeves 173, 175. The piston 170 is connected to a spring 171 under compression. The parts 174 and 175 define a wide cavity 177. The narrow head 172 and the narrow sleeve 173 together define a fluid reservoir 176. The wide cavity 177 communicates via aperture 178 with flow line 100 (see FIG. 3), and has an outlet 180. The wide cavity 177 also has a by-pass port 184. The reservoir 176 has a fluid inlet/outlet 182 which communicates with flow line 102 (FIG. 3). The function of the intensifier member 168 is the same as that of the intensifier 88 of FIG. 3.

Figure 16:
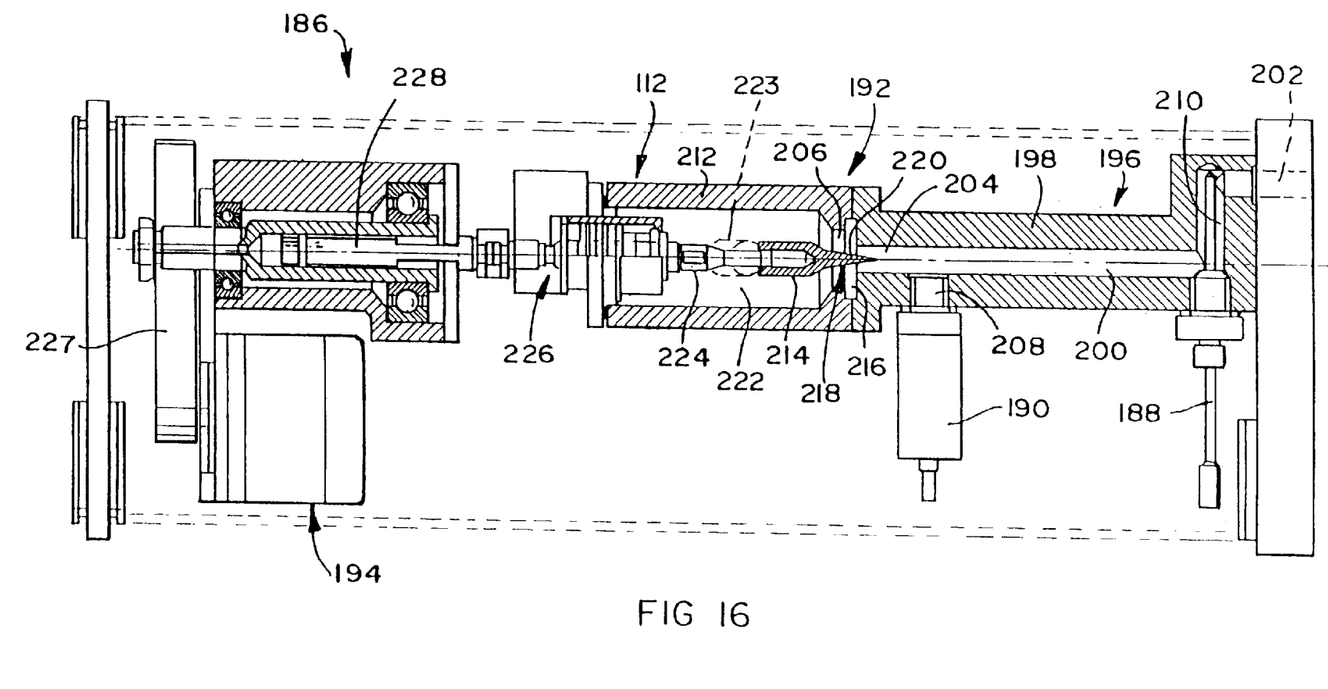
FIG. 16 shows a sectional side elevation of a flow control valve for use with a filtration unit in accordance with the invention.

In FIG. 16, reference numeral 186 generally indicates a modular member in the form of a controller, The controller 186 has temperature sensor 188, pressure sensor 190 and a stabilizer tube unit 196. The controller 186 also includes a throttle valve assembly 112 which comprises a needle valve 192 connected to a stepper motor 194. The stabilizer tube unit 196 has a housing 198 which defines a flow path 200 having an inlet 202 and an outlet 204. The inlet 202 is connected to the retentate flow line 110 (FIG. 3), and the outlet 204 is connected in flow communication with a variable aperture 206 of the needle valve 192. Transverse ports 208, 210 are provided in the housing 198 and respectively receive the pressure sensor 190 and the temperature sensor 188. The stabilizer tube unit 196 stabilizes the fluid flow into the needle valve 192 by reducing turbulence and pressure fluctuations therein.

The needle valve 192 has a housing 212 defining a passage 222 between the aperture 206 which acts as its inlet, and defining a valve outlet at 223. The needle valve 1 92 has aperture setting means in the form of a tapered needle 214 (replaceably mounted and exchangeable with other needles of different sizes and/or shapes) and a valve seat in the form of an orifice disc 216 having a central aperture 218 through which a tapered portion 220 of the needle 214 extends. The orifice disc 216, in conjunction with the needle 214, throttles fluid flow from the inlet 202, through the passages 200 and 222 of the housing 212, to the outlet 223. The valve is illustrated with the aperture 218 closed by the needle 214.

The needle 214 is releasably attached to a spindle 224 which is drivingly coupled to the stepper motor 194. This coupling involves a screw drive- or transmission arrangement at 226 whereby rotation of the stepper motor via a belt drive 227 rotates a shaft 228 driving the screw arrangement 226. This screw arrangement 226 screws the needle 214 into or out of the orifice 218 to throttle the valve 112 to a greater or lesser degree, depending on the direction of rotation, the spindle 224 being keyed to the needle 214 rotationally, but slidable axially relative to the needle 214.

The needle 214 and orifice disc 216, which is also interchangeable with other orifice discs of different shapes and/or sizes, are selected to suit a chosen rate of fluid flow from the inlet 202 to the outlet 223. Accordingly, both the needle 214 and the orifice disc 216 are selectively interchangeable to allow operation of the needle valve 1 92 in a more or less optimal flow control position.

In use, and with particular reference to FIG. 3, raw fluid feed to be filtered is fed into the unit 10 along flow line 48, valves 50 and 60 being open, and valves 66 and 70 being closed, with the sponge balls 74 located in the cage 72 of the catch pot 58. Valves 62 and 82 are open, and valves 84, 101 and 108 are closed.

Fluid flows from flow line 48 along one of the filtration passages 54 to the end of the filter element remote from the line 48, where it is deflected by the deflector plate 20 into another of the passages 54 to flow in the reverse direction. At the end of the element 46 connected to the feed line 48 this flow is again deflected, this time by the deflector plate 18, to flow in the original direction along another of the passages 54 towards the end of the filter element 46 having the deflector plate 20. This flow reversal takes place successively at each end of the filter element 46 by means of the deflector plates 18 and 20, which connect the various passages 54 in series, so that fluid finally issued from the final passage 54 in the series into flow line 56. The fluid entering flow line 56 is retentate, and this flows through the catch pot 58, passing around the sponge balls 74 and through the cage 72, and from the catch pot 58 through the valve 60 and then through valve 62 (and/or through valve 112 in line 110) and out of the unit 10.

It will be appreciated that the fluid feed is pressurised, and that the valve 112 (or optionally valve 62) acts to throttle fluid flow therethrough, to maintain a suitable high pressure in the filtration passages 54.

Fluid permeates through the filtration membrane on the inner surfaces of the passages 54, and thence through the porous interior of the support of the filter element 46, either radially outwardly into the space between the housing tube 12 and the filter element 46, or radially inwardly into the central drainage tube, where it emerges as permeate.

Permeate flows from the central drainage tube along flow line 76 and from the space between the filter element 46 and housing tube 12 along flow line 78, into flow line 80. Permeate issues from the unit 10 along flow line 80 via valve 82.

To remove debris from the passages 54, valves 50 and 60 can be closed, while valves 66 and 70 are opened. This reverses the direction of flow long the passages 54, and causes the sponge balls 74 to leave the catch pot 58 and to pass along flow lines 56 and 48 and along passages 54 into the catch pot 52, thereby clearing debris out of the passages 54.

From time to time, with the valves 82, 101 and 108 closed, the valve 84 can be opened and sterilizing steam can be passed through flow line 86 via flow lines 76 and 78 and through the element 46 and housing tube 12 to issue via flow lines 48 and 56 from the unit 10, valves 50, 60, 62, 66 and 70 being open for this purpose.

If desired, the valve 82 can periodically be closed while the valve 108 is opened, thereby forcing permeate into the accumulator 104 which will eventually be pressurised up to the same pressure as the pressure in the flow lines 48 and 56. In this regard it is to be noted that the accumulator 104 has a flexible membrane 103 which separates a gas space 105 from the part of the interior of the accumulator 104 in communication with flow line 102.

When the accumulator 104 has been fully pressurised, the valve 108 can be closed and the valve 101 opened, thereby allowing the piston 90 of the intensifier 88 to raise the pressure in the accumulator 104 above the pressure in the flow lines 48 and 56. When the pressure in the accumulator 104 has been fully intensified, valve 101 can be closed and valve 108 opened, thereby causing a shock pulse of fluid flow to take place away from the interior of the accumulator 104 along flow lines 102, 106, 80, 78 and 76 to deliver a pulse of reverse flow into the drainage passage in the element 46 and the space between the element 46 and the housing tube 12. This pulse of reverse flow can act to back-wash the filter element 46, and to dislodge debris from the membrane lining the passages 54. This reverse- or back-pulse operation can be carried out without cutting off feed along feed line 48, although, naturally, subject to a certain degree of pressure drop. Naturally, from time to time, the unit 10 can be shut down and back-washed in conventional fashion.

With reference to FIG. 15, to operate the intensifier member 168 (see also 88 in FIG. 3), the valves 82 and 108 (FIG. 3) can be closed while the valve 101 is opened and the by-pass port 184 is closed by means of a valve (not shown), thereby forcing permeate through line 100 (FIG. 3) into the wide cavity 177 of the intensified member 168 which becomes pressurised. As the pressure builds up in the cavity 177, it urges the piston 170 against the spring 171 so that the piston 170 slides down the cylinder parts 175, 174 into the fluid reservoir 176 of the intensifier member 168, which is.in fluid communication via outlet 182 with the accumulator 104 (FIG. 3). When the accumulator 104 has been fully pressurised, the valve 101 can then be closed and valve 108 opened, thereby causing a shock pulse of fluid flow to take place away from the fluid reservoir 176 of the intensifier member 168 along flow lines 102, 106, 80, 78 and 76 to deliver a pulse of reverse flow to back-wash the filter element 46. The fluid reservoir 176 and/or the accumulator 104 can instead be filled with liquid from a source other than the permeate, such as from an external liquid pressure source, if desired.

To operate the system 10, the electronic control unit in the plate 44 can be used to control the various valves, and hence fluid flows, in the unit. The electronic control unit in the plate 44 operates via pilot valves in the plate 42. The valves in the plate 42 are conventional valves and are small and solenoid-operated. Like the remainder of the valves (except the valve 112 which can be of any appropriate construction) of the filter system 10, the pilot valves of the plate 42 are of the construction shown in FIGS. 11 and 12.

The controller 186 illustrated in FIG. 16 allows determination of flow rate from known fluid characteristics, eg from the fluid temperature, pressure and density, as well as from the setting of the throttle valve 112, thereby avoiding the necessity of a flow-meter, which is usually employed to measure the retentate flow rate. The controller 186 can be used, not only to control flow rate by measuring temperature and pressure, and setting the valve aperture 218 accordingly, but can similarly, in principle, be used to control fluid pressure, by setting the valve aperture 218, in response to pressure measurements, at a setting which provides a desired pressure upstream of the valve 112, the valve 112 being calibrated accordingly. It should be noted, in particular, that pressure measurements are made upstream of the valve 112, and are gauge pressure measurements (and not absolute pressure measurements, the pressure drop to atmosphere from said upstream side being measured, as such pressures tend to be more stable, with fewer fluctuations, than pressure measurements downstream of the valve 112. Thus, when the valve 112 is downstream of the unit 10, this pressure is affected only by a pump (not shown) feeding the unit 10, whereas measuring pressure downstream of the valve 112 can by influenced by what is being done downstream of the valve 112, and can be less reliable.

The invention will now be described by way of non-limiting illustration with reference to the following Example describing preliminary pilot-scale filtration tests.

EXAMPLE

A filtration system similar to the filtration unit illustrated in FIGS. 1–3 was assembled and tested. The filter unit was driven by means of pumps directly connected to the filter unit to provide a pressurised fluid supply and tests were also conducted using an elevated drum having a volume of 100 l. The drum was equipped with 23 kW geyser elements, with one geyser element having a thermostat so as to provide water feed at elevated temperature for test purposes.

A ceramic filter element equipped with a suitable membrane sintered thereto was not available and therefore a dummy element was manufactured to simulate a ceramic filter element. The dummy element comprised an aluminium cylinder having thirty-seven 9.0 mm diameter feed flow bores provided therein and arranged to emulate a spongeball-cleanable ceramic filter element. Permeate outlets were provided by the provision of thirty-six 2 mm holes drilled into 18 circumferentially spaced outermost feed flow inlet bores of the dummy element in communication with a permeate outlet port. To simulate membrane resistance, the permeate outlet port was equipped with a manual needle valve to allow throttling of permeate flow.

No pressure accumulator was available during the tests and therefore an intensifier plate (see FIG. 15) was tested.

The dummy element was pressure tested to 6 MPa and tests were also conducted over the pressure range 2–4 MPa at temperatures varying from ambient (20–25° C.) up to 57° C. using municipal tap-water as the test fluid.

It was found that the test unit was able to withstand >10 MPa pressure pulses with the unit originally having been pressurised to 8 MPa. Valve sleeves were unaffected by routine operation at up to 6 MPa pump outlet pressure but damage was found to occur to one sleeve when the >10 MPa pulse tests were carried out. The rubber of the sleeve was extruded through the 2 mm valve cage aperture during the >10 MPa pulse tests. The valve tested were similar to the valves illustrated in FIGS. 11 and 12 with the slots 160 replaced by rows of apertures.

The calibration of the test filter unit was carried out at a pressure 1–5 MPa with test runs being conducted within the 2–4 MPa range. The pump relief valve was set at a pressure of 6 MPa during the test runs. The valves used in the test system had operating ranges of 0.8–1.0 MPa upwards, and, as mentioned above, the temperatures employed in the tests ranged from ambient temperature up to 57° C. with several tests being conducted for 6–8 hour periods at 37–47° C.

The total pre-delivery running time exceeded 100 hours.

Some problems were encountered with the pumping equipment which comprised axial piston pumps equipped with mechanical variable speed drives. Pump pulsing was evident throughout the tests even though a small <1 l bladder-type shock absorber was installed at the pump delivery outlet. This bladder was inflated to 0.7 MPa during the test runs. It was evident during the test that it will be desirable to incorporate an accumulator system to minimise pulses which will probably be encountered in a full-scale filtration system. Alternatively, instead of an accumulator system, it may be possible to employ a multi-stage turbine unit to minimise pulsing.

Feed pulses have several effects on the filter unit. As the flow through the filter unit is related to the square root of the pressure at the orifice of the filter, any rapid fluctuations in pressure result in an average flow-over time which is less than that indicated by taking the average pressure and totalizing the flow at that pressure over the same time. Acceleration-deceleration effects also influence flow through the orifice in an unstable manner. The high frequency pulses adversely affected the strain-gauge pressure-sensor in the test unit.

Strain was found not to be sinusoidal but tended to be clipped on the negative portion of the cycle thus giving an inflated average. It was found that the test unit reacted to the false data input and closed the orifice beyond that required for actual optimum flow through the test unit, with the result that the net flow through the test unit was too low.

It was found that moderate pump speeds (>2 m static pump inlet head) and 0.7 MPa bladder inflation yielded results closely in accord with theoretical expectations and which could reliably be repeated. The sponge-ball test unit had a theoretical input flow of about 12 l/minute with specified recovery ratio ranges of from 80–96%. The test unit flows ranged from 20% down to 5% of 12 l/minute ie 2.4–0.6 l/minute. Valve characteristics were studied using a flow ranging from 10 l/minute down to substantially no flow.

It is a particular advantage of the invention, particularly as illustrated in the drawings, that all the ancillary equipment and plumbing for the unit 10 can form part of composite tube closures at opposite ends of the tube 12, made up of bundles of modular members or plates stacked together. The bundles lend themselves to automation, i.e. automatic, eg electronic, control (although manual control can naturally, if desired, be used; and the various parts of each bundle, and the filter unit comprising the tube 12 and element 46, can all be held together by the same clamping element or elements, such as a set of bolts.

The filtration system of the present invention, as illustrated in the drawings, has a number of advantages:
  compactness;
  a reduced number of external high pressure connections or valves which require leak testing;
  modularity;
  a requirement for only one pump;
  location of items such as supports, housings, fluid conduits, flow connections and valves in one or the other of the end closures;
  facilitation of maintenance because dismantling and reassembly after cleaning and/or replacement of worn parts can be achieved in a matter of hours;
  suitable for automation at acceptable cost; and
  good response time of the system because of the use of short internal conduits and internal valves with electronic control.

What is claimed is:

1. A filtration system which comprises a filter unit having a hollow housing which encloses at least one filter element, the filter unit having a feed fluid inlet opening into the interior of the housing and communicating with an upstream side of each filter element, a retentate outlet leading from said interior of the housing and communicating with said upstream side of each filter element, and a permeate outlet leading from the interior of the housing and communicating with a downstream side of each filter element, said permeate outlet being isolated from the retentate outlet and from the inlet by the filter element or elements, and the retentate outlet being spaced from the inlet and in communication therewith, and the system including at least one bundle made up of a plurality of releasably interconnected modular members, which bundle forms a flow control unit for controlling fluid flow through the filter unit from its feed fluid inlet to its permeate outlet, at least one of the modular members including a valve and a plate, the valve being located inside the plate.

2. A system as claimed in claim 1, which includes two bundles of modular members, which bundles respectively form two flow control units, one for controlling fluid flow from the feed fluid inlet to the retentate outlet, and another for controlling fluid flow through the permeate outlet.

3. A system as claimed in claim 1 or claim 2, in which each bundle of modular members is mounted on the housing.

4. A system as claimed in claim 3, in which the housing is tubular, having at least one open end closed by an end closure in the form of a said bundle of modular members forming a flow control unit.

5. A system as claimed in claim 4, in which the housing has two open ends, each closed by an end closure, at least one of the end closures being in the form of a said bundle of modular members forming a flow control unit.

6. A system as claimed in claim 1, in which there is a single filter element of porous sintered ceramic material, the filter element having a plurality of passages in its interior, the passages extending alongside one another and being transversely spaced from one another, at least one of the passages being a filtration passage in communication with the feed fluid inlet and with the retentate outlet and at least one of the passages being a drainage passage, and each drainage passage being in communication with the permeate outlet and being isolated from each filtration passage.

7. A system as claimed in claim 6, in which there is a plurality of the filtration passages, the filter material acting as a filter membrane support and each filtration passage being lined with a filter membrane, there being a plurality of the drainage passages and the filter element having an outer surface the major part of which faces into a space between the filter element and the housing.

8. A system as claimed in claim 6, in which a said bundle of modular members is mounted on the housing, the bundle including a modular member in the form of a low deflector member, the filter element having a plurality of filtration passages and the deflector member defining at least one fluid flow path for deflecting fluid flowing along a filtration passage in the filter element into another filtration passage in the filter element.

9. A system as claimed in claim 6, in which the filter element is elongate, the housing being elongate and the filter element extending along the interior of the housing, the filter element having a cross-sectional area equivalent to the area of a circle having a diameter of 40 mm–200 mm, and the filter element having a length of 1.5 m–6 m.

10. A system as claimed in claim 9, in which the housing is made up of two portions, one of which is received spigot-socket fashion in the other, being telescopically slidable therein and sealed thereto, to permit unequal thermal expansion of the housing and each filter element enclosed therein.

11. A filter unit for a filtration system as claimed in claim 1, the filter unit comprising a hollow housing which is provided at opposite ends thereof with respective end closures, the housing enclosing at least one filter element comprising sintered ceramic material, the unit having a feed fluid inlet opening into the interior of the housing and communicating with an upstream side of the or each filter element, a retentate outlet leading from the interior of the housing and communicating with said upstream side of the or each filter element, and a permeate outlet leading from the interior of the housing and communicating with a downstream side of the or each filter element, said permeate outlet being isolated from the retentate outlet and from the inlet by the filter element or elements and the retentate outlet being spaced from the inlet and in communication therewith, the housing comprising two portions telescopically slidable relative to each other and sealed together by a peripherally extending seal therebetween which permits one said portion to slide longitudinally within the other.

* * * * *

UNITED STATES PATENT AND TRADEMARK OFFICE
CERTIFICATE OF CORRECTION

PATENT NO. : 6,575,308 B1
DATED : June 10, 2003
INVENTOR(S) : Fuls et al.

It is certified that error appears in the above-identified patent and that said Letters Patent is hereby corrected as shown below:

<u>Column 18,</u>
Line 19, please delete "or claim 2".

Signed and Sealed this

Twenty-fifth Day of November, 2003

JAMES E. ROGAN
*Director of the United States Patent and Trademark Office*